United States Patent
Dinkel

(10) Patent No.: US 8,413,333 B2
(45) Date of Patent: Apr. 9, 2013

(54) METHOD FOR MAKING AN ASYMMETRICAL CONCRETE BACKERBOARD

(76) Inventor: Jeff Dinkel, Marietta, GA (US)

( * ) Notice: Subject to any disclaimer, the term of this patent is extended or adjusted under 35 U.S.C. 154(b) by 0 days.

(21) Appl. No.: 12/710,109

(22) Filed: Feb. 22, 2010

(65) Prior Publication Data

US 2010/0146788 A1   Jun. 17, 2010

Related U.S. Application Data

(62) Division of application No. 09/829,256, filed on Apr. 9, 2001, now abandoned.

(51) Int. Cl.
*B21D 47/00* (2006.01)
*B32B 37/00* (2006.01)
*B32B 3/18* (2006.01)

(52) U.S. Cl.
USPC ........... 29/897.32; 29/897.3; 156/39; 156/42; 156/44; 156/45

(58) Field of Classification Search ............... 29/897.34, 29/897.32, 897.3; 156/39, 42, 44, 45
See application file for complete search history.

(56) References Cited

U.S. PATENT DOCUMENTS

| | | |
|---|---|---|
| 1,470,260 A | 10/1923 | Emerson |
| 1,474,657 A | 11/1923 | Walper |
| 1,497,261 A | 6/1924 | Emerson |
| 1,805,840 A | 5/1931 | New |
| 2,475,781 A | 7/1949 | Gallup |
| 2,803,575 A | 8/1957 | Riddell et al. |
| 2,894,857 A | 7/1959 | Uraneck et al. |
| 2,895,432 A | 7/1959 | Bowman |
| 2,899,349 A * | 8/1959 | Jenkins .......................... 156/209 |
| 3,284,980 A | 11/1966 | Dinkel |
| 3,307,306 A | 3/1967 | Oliver |
| 3,345,246 A | 10/1967 | Sheahan |
| 3,462,339 A | 8/1969 | Poms |
| 3,466,222 A | 9/1969 | Curtis |
| 3,613,228 A * | 10/1971 | Cook et al. ................. 29/603.16 |
| 3,672,951 A | 6/1972 | Moore et al. |
| 3,709,733 A | 1/1973 | Mautner |
| 3,887,952 A | 6/1975 | Nicoll, Jr. |
| 3,892,899 A | 7/1975 | Klein |
| 3,934,066 A | 1/1976 | Murch |
| 3,971,184 A | 7/1976 | Van Wagoner |
| 4,015,386 A | 4/1977 | Cook |

(Continued)

FOREIGN PATENT DOCUMENTS

| | | |
|---|---|---|
| JP | 55126443 | 9/1980 |
| JP | 55133950 | 10/1980 |

(Continued)

*Primary Examiner* — Sarang Afzali
(74) *Attorney, Agent, or Firm* — Ryan A. Schneider, Esq.; Troutman Sanders LLP

(57) ABSTRACT

The present invention is a method of making a backerboard having a fiberglass mesh on one side, and an impervious reinforcement membrane on the other side. The backerboard incorporates a low density, high compressive strength concrete core having an upper principal surface and a lower principal surface. The upper principal surface of the core is covered by a fiberglass mesh reinforcement layer, itself covered and bonded to the core by a thin layer of Portland cement. The lower principal surface of the backerboard is covered with a high tensile strength, impervious reinforcement membrane.

15 Claims, 3 Drawing Sheets

U.S. PATENT DOCUMENTS

| | | |
|---|---|---|
| 4,122,203 A | 10/1978 | Stahl |
| 4,125,664 A | 11/1978 | Giesemann |
| 4,131,703 A | 12/1978 | Voet |
| 4,159,361 A | 6/1979 | Schupack |
| 4,303,722 A | 12/1981 | Pilgrim |
| 4,356,678 A | 11/1982 | Andrews et al. |
| 4,379,192 A | 4/1983 | Wahlquist et al. |
| 4,413,995 A | 11/1983 | Korpman |
| 4,420,295 A | 12/1983 | Clear et al. |
| 4,450,022 A | 5/1984 | Galer |
| 4,528,238 A | 7/1985 | Alford |
| 4,530,877 A | 7/1985 | Hadley |
| RE32,037 E | 11/1985 | Clear |
| 4,617,219 A | 10/1986 | Schupack |
| 4,722,866 A | 2/1988 | Wilson et al. |
| 4,785,137 A | 11/1988 | Samuels |
| 4,801,496 A | 1/1989 | Buchacher |
| 4,828,635 A | 5/1989 | Flack et al. |
| 4,841,705 A | 6/1989 | Fuhrer |
| 4,882,888 A | 11/1989 | Moore |
| 4,948,647 A | 8/1990 | Burkard |
| 5,030,502 A | 7/1991 | Teare |
| 5,067,298 A | 11/1991 | Petersen |
| 5,224,315 A | 7/1993 | Winter, IV |
| 5,345,738 A | 9/1994 | Dimakis |
| 5,350,554 A | 9/1994 | Miller |
| 5,704,179 A | 1/1998 | Lehnert et al. |
| 5,714,032 A | 2/1998 | Ainsley et al. |
| 5,784,845 A | 7/1998 | Imeokparia et al. |
| 5,791,109 A | 8/1998 | Lehnert et al. |
| 5,961,900 A | 10/1999 | Wedi |
| 6,167,668 B1 | 1/2001 | Fine et al. |
| 6,171,680 B1 | 1/2001 | Fahmy |
| 6,182,407 B1 | 2/2001 | Turpin et al. |
| 6,187,409 B1 | 2/2001 | Mathieu |
| 6,316,087 B1 | 11/2001 | Lehan |
| 6,460,304 B1 | 10/2002 | Kim |
| 6,488,792 B2 * | 12/2002 | Mathieu ............ 156/40 |
| 6,931,809 B1 | 8/2005 | Brown et al. |
| 7,846,278 B2 * | 12/2010 | Porter ............ 156/39 |
| 2001/0000738 A1 | 5/2001 | Mathieu |

FOREIGN PATENT DOCUMENTS

| | | |
|---|---|---|
| JP | 56022685 | 3/1981 |
| JP | 58035956 | 3/1983 |
| JP | 62023742 | 1/1987 |
| JP | 62238734 | 10/1987 |

* cited by examiner

METHOD FOR MAKING AN ASYMMETRICAL CONCRETE BACKERBOARD

CROSS-REFERENCE TO RELATED APPLICATIONS

This application is a divisional of application Ser. No. 09/829,256, filed 9 Apr. 2001, now abandoned, which is hereby incorporated in its entirety as if fully set forth herein.

BACKGROUND OF THE INVENTION

1. Field of the Invention

This invention relates generally to a composite structural panel, and more particularly to an asymmetrical concrete backerboard having fiberglass mesh reinforcement on one side, and an impervious reinforcement membrane on the opposite side of the board.

2. Description of Related Art

The conventional backerboard is made up of a rectangular panel of solid concrete, the concrete core, having both major surfaces covered with fiberglass. The fiberglass adds strength to the board, and provides only limited resistance to water penetration through the board. Concrete backerboards are used extensively in the construction of interior and exterior floors, walls and ceilings. The concrete backerboard is a superior substrate or underlayment for stucco, ceramic tile, marble, and other tile-like surfaces located in wet areas, such as shower walls and bathtub surrounds, and building exterior walls.

Typically, the concrete core of the backerboard is a low density, high compressive strength, concrete core. The fiberglass mesh reinforcement layers overlay both major faces of the core, with each of these pervious fiberglass layers themselves covered with a thin layer of Portland cement. Backerboards have textured cementitious surfaces that provide for a high strength bond with mastics and Portland cement mortars that are used to adhere tile to the substrate in wet areas.

While the conventional backerboard is generally stable and water resistant, it is not an ideal construction panel for use in wet environments due to several inherent limitations. For example, it is generally recommended by backerboard manufactures, and required by most building codes, to use an additional impervious moisture barrier behind the backerboard. Thus, contractors are forced to install the backerboard and separate moisture barrier in the field, at the construction site. Use of an impervious barrier membrane with the backerboard provides protection for the wood or steel structures under or behind the backerboard, and contains the moisture in the wet area. Examples of commonly used moisture barriers are felt paper, Tyvek®, spunbonded olefin and polyethylene.

An exemplary patent in this field includes U.S. Pat. No. 3,284,980 to Dinkel disclosing a precast panel of cement and aggregate reinforced with a skin membrane of fibrous material. Backerboard manufacturing techniques include a lightweight aggregate core faced on each side or face with a fiberglass mesh material bathed in a slurry of neat cement and pressed against the aggregate core, such that when the neat cement and the aggregate core are cured, there is provided a composite, fiberglass mesh reinforced, cementitious panel. U.S. Reissue Pat. No. Re 32,037 to Clear is a method for manufacturing cementitious reinforced panels and illustrates a concrete panel 11 having reinforcement layers 12, 13 and a polyethylene layer 20 adjacent one of the layers 12, 13. Layers 12 and 13 are described as mesh reinforcing elements, preferably constituting fiber mesh like pervious webs, each entrained in hydraulic cement. Layer 20 is a carrier sheet placed under reinforcing element 12 during manufacture. Yet, such methods of constructing backerboards are not only deficient because they produce an inferior wet-area panel, but also because they require the use of a carrier sheet.

It is evident from the prior art that an improved backerboard and method of constructing such an improved backerboard is needed. It can be seen that there is a need for a backerboard having at least one waterproof surface that can be delivered ready-made to the construction site, and a method for producing such a backerboard without resort to a carrier sheet.

BRIEF SUMMARY OF THE INVENTION

Briefly described, in a preferred form, the present invention is a backerboard having a fiberglass mesh on one side, and an impervious moisture barrier membrane on the other side. Such an asymmetrical backerboard design (the two major surfaces of the core having differing moisture-resistant layers, providing different moisture-resistant properties) incorporates numerous advantages over the conventional backerboard design, including having lower manufacture costs, having a waterproof panel deliverable on-site, and having a simplified manufacturing process by eliminating the use of a carrier sheet or web.

The present asymmetrical backerboard comprises a low density, high compressive strength concrete core having an upper principal surface and a lower principal surface. The upper principal surface of the core is covered by a fiberglass mesh reinforcement layer, itself covered and bonded to the core by a thin layer of Portland cement. Alternatively, if the core itself comprises a sufficient amount of randomly dispersed fiberglass fibers, the addition of the fiberglass mesh reinforcement layer may not be required. The lower principal surface of the backerboard is covered with a high tensile strength, impervious moisture barrier membrane.

The present backerboard construction eliminates the prior art necessity of the on-the-construction-site application of a moisture barrier behind the backerboard. It exhibits all of the structural, bonding and workability properties of conventional backerboards, and provides advanced water resistance.

The present method of constructing the backerboard dispenses with the prior art requirement of a carrier sheet or web. In a preferred embodiment of the invention, the panel is manufactured by the concurrent steps of running a continuous pervious reinforcement web through a web coating bath and then removing excess bath therefrom, and running a continuous impervious reinforcement web through a set of pinch rollers and atop a conveyor belt.

Core material is dispensed upon the impervious web via a hopper, and the combination of impervious web and core material run through a screed. The core material is then compacted. The bathed pervious web is then fed onto the top of the core material, forming a sandwich of, from bottom to top, impervious web, core material and pervious web. The composite is then cut into panels.

It is thus an object of the present invention to provide an asymmetrical backerboard and a method for making such a board.

Further, it is an object of the present invention to provide a construction panel having at least one major surface which is highly resistant to the penetration of water.

These and other objects, features, and advantages of the present invention will become more apparent upon reading the following specification in conjunction with the accompanying drawing figures.

DETAILED DESCRIPTION OF THE PREFERRED EMBODIMENTS

The components of the present invention are referenced herein as follows:

| NO. | COMPONENT |
|---|---|
| 10 | Prior Art Backerboard |
| 12 | Concrete Core |
| 14 | Fiberglass Mesh Reinforcement |
| 16 | Layer of Portland Cement |
| 20 | Present Asymmetrical Backerboard |
| 22 | Concrete Core |
| 24 | Upper Principal Surface of Core |
| 26 | Lower Principal Surface of Core |
| 28 | Upper Reinforcement Material |
| 32 | Upper Coating |
| 34 | Impervious Membrane |
| 40 | Present Manufacturing Process |
| 42 | Roll of Impervious Membrane |
| 44 | Pinch Roller Assembly |
| 46 | Conveyor Belt |
| 48 | Core Feed Hopper |
| 52 | Screed |
| 54 | Compaction Station |
| 56 | Compaction Roll |
| 58 | Bath |
| 62 | Roller Assembly |
| 64 | Doctor Assembly |
| 66 | Drag Bar |
| 72 | Step of Feeding |
| 74 | Step of Depositing |
| 76 | Step of Screeding |
| 78 | Step of Compacting |
| 82 | Step of Bathing |
| 84 | Step of Layering |
| 86 | Step of Cutting |

It should be noted that as used herein the term "pervious" defines a property of a material, that property enabling free water to penetrate through a material, and that the term "impervious" defines a property of a material, that property being highly resistant against enabling free water to penetrate through a material. An impervious material may enable water vapor to penetrate through a material.

Figure 1:
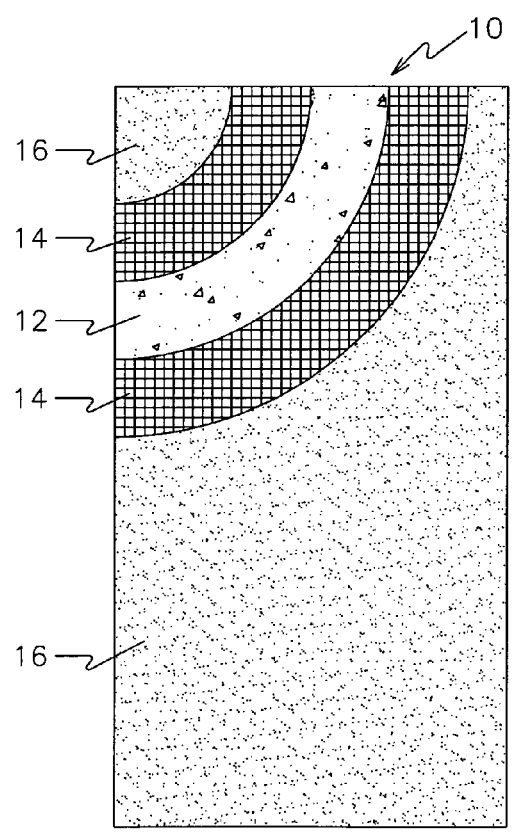
FIG. 1 is a front sectional view of a prior art backboard.
Figure 2:
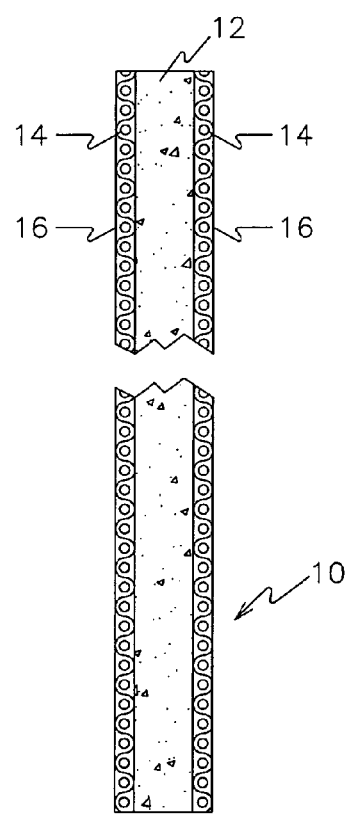
FIG. 2 is a side view of FIG. 1.

Referring now in detail to the drawing figures, wherein like reference numerals represent like parts throughout the several views, FIGS. 1 and 2 illustrate a conventional backerboard 10 comprising a low density, high compressive strength, concrete core 12. A layer of fiberglass mesh reinforcement 14 covers both major faces of the core 12, with each of these pervious fiberglass layers themselves 14 covered with a thin layer 16 of Portland cement.

Figures 3, 4:
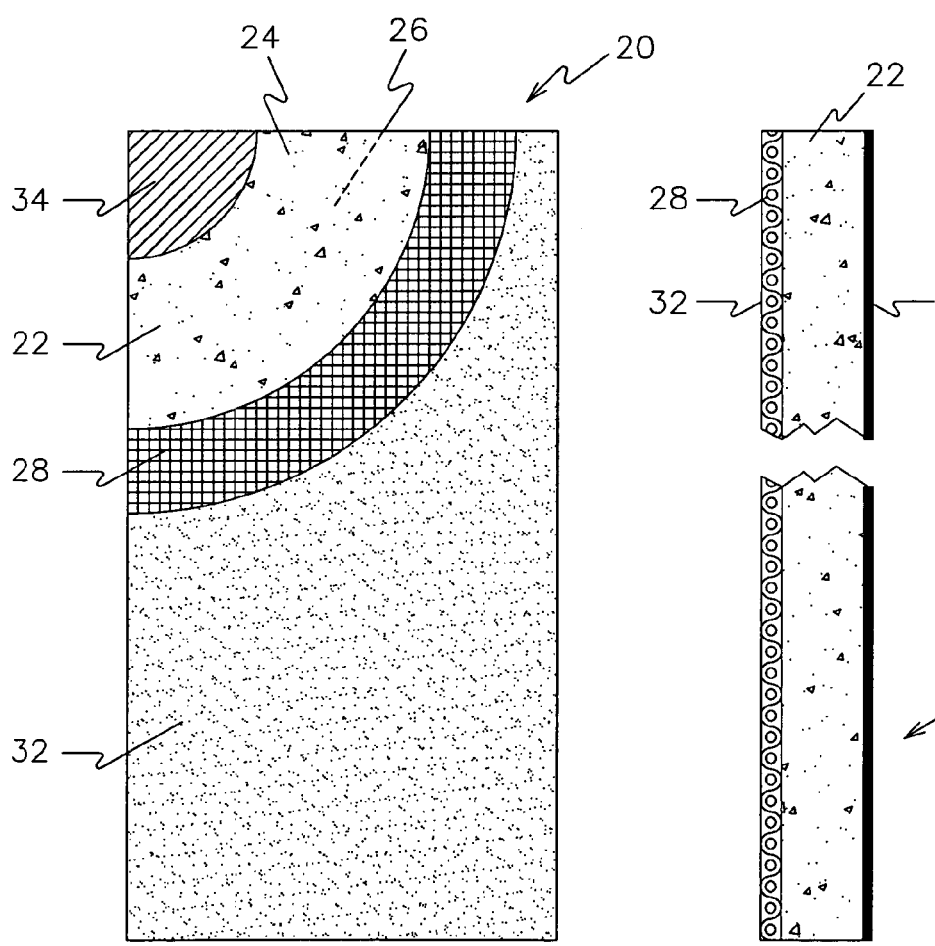
FIG. 3 is a front sectional view of the present asymmetrical backboard according to a preferred embodiment of the present invention.
FIG. 4 is a side view of FIG. 3.

As shown in FIGS. 3 and 4, The present invention 20 comprises a core 22 having an upper principal surface 24 and a lower principal surface 26, an upper reinforcement material 28 in contact with the upper principal surface 24 of the core 22, an upper coating 32 in communication with the upper principal surface 24 of the core 22 and the upper reinforcement material 28, and an impervious membrane 34 covering the lower principal surface 26 of the core 22.

The core 22 can comprise low, medium and high slump concrete. The concrete preferably includes Portland cement and lightweight fillers and/or aggregates of, for example, expanded shale, expanded clay, sintered clay, pumice, slag, calcium carbonate, slate, diatomaceous slate, perlite, vermiculite, scoria, volcanic cinders, tuff, diatomite, sintered fly ash, industrial cinders, gypsum, foam beads, glass beads and the like. Other additives that can be mixed with the Portland cement include lightweight sand and alkaline resistant fibers such as chopped reinforcement fibers, randomly dispersed in the core 22.

The upper reinforcement material 28 is preferably pervious and comprises woven fiberglass mesh or fiberglass shim with an alkaline resistant coating. Alternatively, the reinforcement material 28 can be a polymer fiber mat. In yet another embodiment, the upper reinforcement material 28 can, in essence, be made a part of the core 22, such that the addition of a separate layer of upper reinforcement material is not necessary. For example, the core 22 can comprise a sufficient amount of alkaline resistant fibers wherein an upper reinforcement material layer need not be an additional element of the present backerboard 10.

The upper coating 32 can be a Portland cement slurry being either neat or foamed. The slurry can comprise fine aggregate and/or filler material.

The impervious membrane 34 preferably comprises a polymer membrane, for example, a fiber mat, Tyvek®, Typar®, brand spunbonded olefin, or a layer of waterproofed paper or cardboard. The impervious membrane 34 can specifically include an alkaline resistant dense polymer fiber mat.

Manufacture

Figure 5:
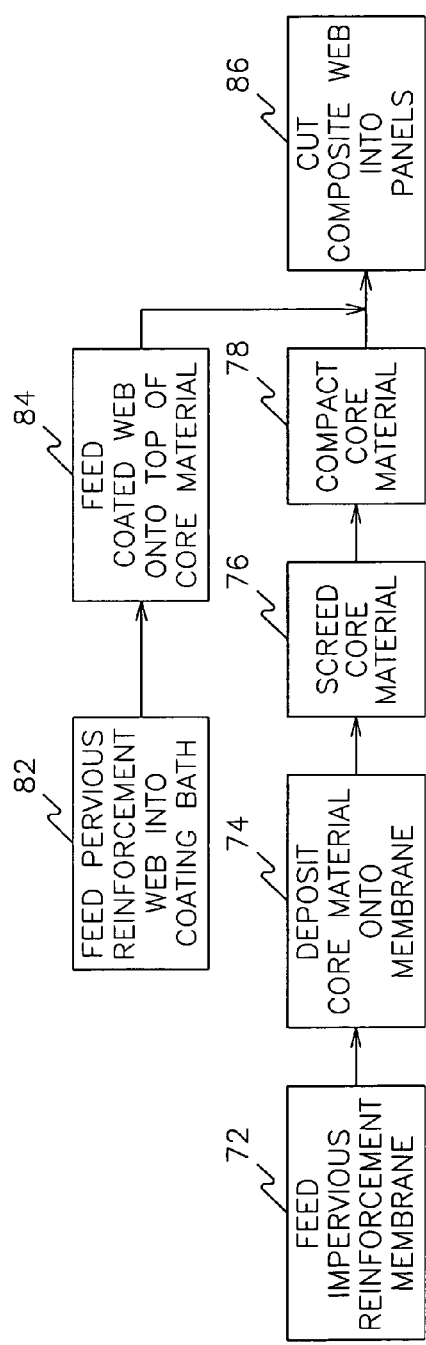
FIG. 5 is a block diagram of a preferred construction method for the backerboard of FIG. 3.
Figure 6:
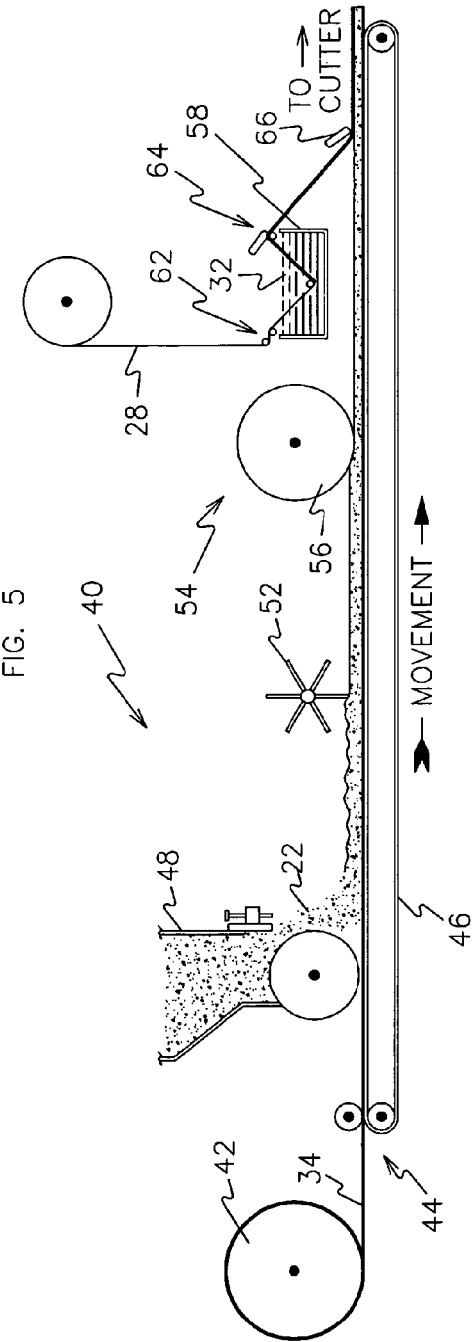
FIG. 6 illustrates the manufacture of the backerboard of FIG. 3.

The present manufacturing process 40 (as shown left to right in FIGS. 5 and 6) incorporates a first feeding step 72 of running a continuous roll 42 of the impervious membrane 34 out through a pinch roller assembly 44. The impervious membrane 34 is at that point supported and conveyed by a conveyor belt 46.

In a second depositing step 74, the membrane 34 is conveyed beneath a core material dispense hopper 48, through which the cementitious core mix of the core 22 if fed onto the membrane 34. Hopper 48 can include elements (not shown), for example, a metering gate for controlling the amount of mix laid onto the membrane 34.

A third screeding step 76 of the present manufacturing process includes reducing the thickness of the core mix. The conveyor belt 46 carries the membrane 34/core mix composite through screed 52 to reduce the thickness, and smooth out the upper surface, of the core mix. Thereafter, in a fourth compacting step 78, the conveyor belt 46 moves the membrane 34/core mix composite into a compaction station 54 that can include a compaction roll 56 that which serves to compact the core mix against the impervious membrane 34. This compaction increases the density of the core and enhances the bond of the membrane 34 to the core mix.

In a fifth bathing step 82, a roll of the upper reinforcement material 28 is run through a bath 58 of the upper coating 32, and in a sixth layering step 84, the upper reinforcement material 28 is laid down on the core mix. A roller assembly 62 can serve to draw the upper reinforcement material 28 through the bath 58 and a doctor assembly 64 can remove any excessive slurry from the material 28. A drag bar 66 can be positioned above the material 28 which drags against its upper surface, thereby serving to urge core mix on the upper surface of the material 28 into the interstices of the material 28 and through the material 28. In a final cutting step 86, the backerboard is then cut downstream (not shown) into panels.

The present manufacturing process 40 has great advantages over the prior art processes. During the manufacture of the standard concrete backerboard, with cementitious surfaces on both sides, the conventional forming conveyor must be protected from contact with the bottom of the core/pervious (as opposed to the present invention's impervious membrane 34) surface while in its plastic state. This is accomplished by the use of a form, a carrier sheet or a disposable carrier web. These forms and carrier sheets are treated with a release agent and remain with the backerboard until it has hardened, at which time the form or carrier sheet is separated from the backerboard, cleaned and recoated with release agent to be reentered into the forming operation. In the case of manufacturing with a carrier web, the web is treated with a release agent and is dispensed onto the forming conveyer where the backerboard is formed on the carrier web. This web remains with the backerboard until it hardens at which time the carrier web is removed and disposed.

The present invention avoids the carrier sheet problem by providing a backerboard with a cementitious surface on only one side, and a high tensile strength impervious membrane 34 on the other side. Manufacturing this improved backerboard with the membrane 34 on the bottom side eliminates the need for a form, a carrier sheet, a release agent or a carrier web. The impervious membrane 34 which is incorporated into the present backerboard composite, essentially becomes a non-disposable carrier web. The manufacturing process thus is greatly simplified by ridding the process and equipment required to treat the carrier or form with release agent, dispensing the carrier or form into the forming process, separating the carrier or form from the backerboard, cleaning the carrier or form, retreating the carrier or form with release agent, and/or dispensing of and disposing of the carrier web. Additionally the cost of the impervious high tensile strength membrane 34 is approximately one-forth (¼) of the cost of vinyl coated fiberglass mesh with comparable tensile strength.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of manufacturing a construction element for use as an underlayment or backerboard, the method comprising:
    running a continuous web of impervious reinforcement membrane directly onto a conveyor belt;
    depositing a cementitious core material onto the web of impervious reinforcement membrane;
    disposing a reinforcement mesh onto the top surface of the cementitious core material;
    curing the core material;
    permanently adhering the web of impervious reinforcement membrane directly to the cementitious core material during the curing of the core material, the continuous web of impervious reinforcement membrane forming a bottom impervious non-cementitious surface of the construction element as the construction element is removed from the conveyor belt; and
    permanently adhering the reinforcement mesh to the top surface of the cementitious core material during the curing of the core material, the reinforcement mesh forming a top pervious cementitious surface of the construction element.

2. The method of claim 1, wherein the core material is the first material or element placed on the web of impervious reinforcement membrane, wherein the reinforcement mesh is embedded into the core material, and the web of impervious reinforcement membrane is not a carrier sheet for the core material, but is permanently attached to the core material to form the bottom impervious non-cementitious surface of the construction element.

3. The method of claim 1, further comprising running the continuous web of the impervious reinforcement membrane from a roll through a pinch roller assembly.

4. The method of claim 1, further comprising screeding the core material to provide a flat and level evenly distributed layer of core material after depositing on the web of impervious reinforcement membrane.

5. The method of claim 1, further comprising conveying the reinforcement mesh through a bath of coating material.

6. The method of claim 1, further comprising compacting the cementitious core material on the web of impervious reinforcement membrane to enhance bonding between the cementitious core material and impervious reinforcement membrane such that the impervious membrane is permanently attached to the core material.

7. The method of claim 1, further comprising urging the reinforcement mesh on to the top surface of the core material by conveying the reinforcement mesh and core material underneath a drag bar.

8. The method of claim 1, further comprising cutting the construction element into panels and stacking the panels to cure, such that after curing a bottom surface of a finished panel does not have a reinforcement mesh embedded therein.

9. The method of claim 1, the web of impervious membrane comprising a single layer of, non-cementitious polymer membrane.

10. The method of claim 1, the impervious membrane comprising a reinforced polymer membrane.

11. The method of claim 1, the impervious membrane comprising waterproof paperboard.

12. The method of claim 1, the impervious membrane comprising spunbonded olefin.

13. The method of claim 1, the impervious membrane comprising an alkaline resistant dense polymer fiber mat.

14. The method of claim 1, the impervious membrane comprising Tyvek®.

15. A method of making a construction element, the method consisting essentially of:
    running a continuous web of impervious non-cementitious reinforcement membrane directly onto a conveyor belt;
    depositing a cementitious substance directly onto the impervious non-cementitious reinforcement membrane;
    placing a layer of pervious non-cementitious reinforcement material only atop the cementitious substance; and
    removing the construction element from the conveyor belt.

* * * * *